US005884903A

United States Patent [19]

Sawdon

[11] Patent Number: 5,884,903

[45] Date of Patent: Mar. 23, 1999

[54] POWERED CLAMP AND GAUGING APPARATUS

[75] Inventor: Edwin G. Sawdon, St. Clair, Mich.

[73] Assignee: BTM Corporation, Marysville, Mich.

[21] Appl. No.: 550,536

[22] Filed: Oct. 30, 1995

[51] Int. Cl.[6] ........ B23Q 3/08

[52] U.S. Cl. ........ 269/32; 269/27; 269/24; 269/91; 269/93; 269/94

[58] Field of Search ........ 74/105, 106; 269/32, 269/27, 24, 91, 93, 94

[56] References Cited

U.S. PATENT DOCUMENTS

| | | |
|---|---|---|
| D. 334,701 | 4/1993 | Blatt et al. . |
| 1,667,616 | 4/1928 | Wright et al. . |

(List continued on next page.)

FOREIGN PATENT DOCUMENTS

| | | |
|---|---|---|
| 0 317 924 | 11/1988 | European Pat. Off. . |
| 0 341 155 | 5/1989 | European Pat. Off. . |
| 0 508 881 | 4/1992 | European Pat. Off. . |
| 2 484 310 | 6/1981 | France . |
| 2 340 798 | 8/1990 | France . |
| 25 55 207A1 | 7/1976 | Germany . |
| 1036830 | 7/1966 | United Kingdom . |
| 2 082 945 | 3/1982 | United Kingdom . |

OTHER PUBLICATIONS

PG–38 & PG–45 Locking Grippers, entire brochure, BTM Corporation (1997).

BTM PG 1500 P2F Assembly drawing, BTM Corporation (1991).

BTM PG 1500 P3F Assembly drawing, BTM Corporation (1991).

BTM Corporation 1500 & 2500 Series Sealed Offset Toggle Clamps, three pages, (prior to Mar. 13, 1992).

BTM Corporation 1500–2500 Series Sealed Toggle Clamps, three pages, (prior to Mar. 13, 1992).

BTM Sealed Power Clamps, ten pages, (prior to Mar. 13, 1992).

BTM Omni–Head Mini–Power Clamps, three pages, (prior to Mar. 13, 1992).

BTM Omni–Head 100 Series Mini–Power Clamps, one page, (prior to Mar. 13, 1992).

BTM Thin Power Clamps 2500–2000–390 Series, 1500–1000–140 Series, five pages, (prior to Mar. 13, 1992).

BTM Corporation Power Clamps 1500–1000–140 Series, three pages, (prior to Mar. 13, 1992).

BTM Corporation 1500 Series Power Grippers and Accessories, four pages, (prior to Mar. 13, 1992).

BTM "1500 Series Omni–Head Power Clamps", prior to Oct. 30, 1995, entire brochure.

BTM "Power Clamps & Grippers", prior to Oct. 30, 1995, entire brochure.

BTM "Grippers for High Speed Part Transfer in Press", prior to Oct. 30, 1995, entire brochure.

BTM "Sealed Power Clamps", prior to Oct. 30, 1995, entire brochure.

BTM Sealed Toggle Clamps, prior to Oct. 30, 1995, entire brochure.

BTM Corporation "Power Clamp 1500 Series", Prior to Oct. 30, 1995, entire brochure.

BTM "Optional AC & DC Electrical Proximity Switches for BTM Power Clamps", prior to Oct. 30, 1995, 1 sheet (both sides).

*Primary Examiner*—James G. Smith
*Assistant Examiner*—Lee Wilson
*Attorney, Agent, or Firm*—Harness, Dickey & Pierce, P.L.C.

[57] ABSTRACT

A powered clamp and gauging apparatus performs as a clamp with moveable members which generate a toggle action, or performs as a gauging device having a pair of moveable members which mechanically abuts against each other to maintain, at least temporarily, a locking position of an arm even when actuating fluid pressures have been decreased or lost. In another aspect of the present invention, a lost linear motion device is provided in order to maximize arm unlocking forces. A uniquely configured slide, crank and hub are provided in a further aspect of the present invention. Methods of operating and assembling the present invention apparatus are also provided.

63 Claims, 10 Drawing Sheets

U.S. PATENT DOCUMENTS

| | | | |
|---|---|---|---|
| 1,736,171 | 11/1929 | Powell . | |
| 2,381,999 | 8/1945 | Bonnafe . | |
| 2,845,847 | 8/1958 | Blatt et al. . | |
| 3,027,155 | 3/1962 | Paterson . | |
| 3,058,214 | 10/1962 | Mekler . | |
| 3,273,878 | 9/1966 | Blatt . | |
| 3,365,253 | 1/1968 | Haller . | |
| 3,371,923 | 3/1968 | Blatt . | |
| 3,469,892 | 9/1969 | Langstroth . | |
| 3,545,050 | 12/1970 | Blatt et al. . | |
| 3,565,415 | 2/1971 | Blatt . | |
| 3,570,835 | 3/1971 | McPherson . | |
| 3,618,931 | 11/1971 | Blatt . | |
| 3,702,185 | 11/1972 | Blatt . | |
| 3,724,837 | 4/1973 | McPherson . | |
| 4,019,784 | 4/1977 | Ladin et al. . | |
| 4,021,027 | 5/1977 | Blatt . | |
| 4,234,057 | 11/1980 | Nakane et al. . | |
| 4,240,620 | 12/1980 | Tünkers . | |
| 4,365,792 | 12/1982 | Johns | 269/24 |
| 4,396,183 | 8/1983 | Lymburner . | |
| 4,445,676 | 5/1984 | Tünkers . | |
| 4,451,026 | 5/1984 | Coope . | |
| 4,458,889 | 7/1984 | McPherson et al. . | |
| 4,494,739 | 1/1985 | Valentine . | |
| 4,496,138 | 1/1985 | Blatt . | |
| 4,518,187 | 5/1985 | Blatt et al. . | |
| 4,570,914 | 2/1986 | Blatt . | |
| 4,591,138 | 5/1986 | Baills et al. . | |
| 4,596,415 | 6/1986 | Blatt . | |
| 4,618,131 | 10/1986 | Campisi et al. . | |
| 4,620,696 | 11/1986 | Blatt . | |
| 4,637,597 | 1/1987 | McPherson et al. . | |
| 4,647,097 | 3/1987 | Lessway . | |
| 4,647,100 | 3/1987 | Lessway . | |
| 4,673,173 | 6/1987 | Shochi et al. . | |
| 4,696,503 | 9/1987 | Collodel . | |
| 4,707,013 | 11/1987 | Vranish et al. . | |
| 4,723,767 | 2/1988 | McPherson et al. . | |
| 4,723,806 | 2/1988 | Yuda . | |
| 4,768,821 | 9/1988 | Hucul et al. . | |
| 4,777,445 | 10/1988 | Kahl . | |
| 4,793,602 | 12/1988 | McPherson . | |
| 4,834,663 | 5/1989 | Kahl . | |
| 4,836,091 | 6/1989 | Taylor . | |
| 4,854,564 | 8/1989 | McPherson et al. . | |
| 4,859,138 | 8/1989 | Brocklebank et al. | 74/105 |
| 4,863,150 | 9/1989 | Hödl et al. . | |
| 4,892,344 | 1/1990 | Takada et al. . | |
| 4,905,973 | 3/1990 | Blatt . | |
| 4,921,233 | 5/1990 | Fabrice . | |
| 4,923,184 | 5/1990 | Schauss . | |
| 5,072,652 | 12/1991 | Blatt . | |
| 5,118,088 | 6/1992 | Sawdon . | |
| 5,125,632 | 6/1992 | Blatt et al. . | |
| 5,152,566 | 10/1992 | Blatt et al. . | |
| 5,152,568 | 10/1992 | Blatt . | |
| 5,163,729 | 11/1992 | Borcea et al. . | |
| 5,165,670 | 11/1992 | Sawdon | 269/32 |
| 5,171,001 | 12/1992 | Sawdon . | |
| 5,174,709 | 12/1992 | Blatt et al. . | |
| 5,222,854 | 6/1993 | Blatt et al. . | |
| 5,277,411 | 1/1994 | Justus . | |
| 5,299,847 | 4/1994 | Blatt et al. . | |
| 5,452,981 | 9/1995 | Crorey et al. . | |
| 5,490,663 | 2/1996 | Stojkovic et al. . | |
| 5,516,173 | 5/1996 | Sawdon . | |
| B1 4,905,973 | 7/1994 | Blatt . | |

POWERED CLAMP AND GAUGING APPARATUS

BACKGROUND AND SUMMARY OF THE INVENTION

This invention relates generally to clamping devices and particularly to a powered clamp having a toggle action and to a gauging apparatus having a locking feature.

Powered clamps are commonly used in industrial applications for holding work pieces of many sizes and shapes during forming and machining operations. Such devices typically include a pneumatically or hydraulically actuated cylinder which causes one or more arms to move through a desired range of rotational motion to push against a work piece. Depending on the specific application, the user may wish to actuate one or two arms which may be vertically or horizontally aligned in an environment contaminated with weld splatter, saw chips, coolants, dust and dirt. One such conventional powered clamp is disclosed in U.S. Pat. No. 5,171,001 entitled "Sealed Power Clamp" which issued to the present inventor on Dec. 15, 1992 and is hereby incorporated herein by reference.

Other traditional powered clamps are disclosed in the following U.S. Pat. Nos. 4,905,973 entitled "Power Operated Clamp With Externally Mounted Adjustable Clamp Arm" which issued to Blatt on Mar. 6, 1990; 4,637,597 entitled "Locking Power Clamp" which issued to McPherson, et al, on Jan. 20, 1987; 4,496,138 entitled "Power Operated Clamp" which issued to Blaft on Jan. 29, 1985; 4,494,739 entitled "Power Operated Rotatable Clamping Assembly" which issued to Valentine on Jan. 22,1985; 4,458,889 entitled "Locking Power Clamp" which issued to McPherson, et al, on Jul. 10, 1984; 4,021,027 entitled "Power Wedge Clamp with Guided Arm" which issued to Blatt on May 3,1977; 3,702,185 entitled "Cylinder Operated Power Clamp" which issued to Blatt on Nov. 7, 1972; and 3,570,835 entitled "Power Operated Clamping Device" which issued to McPherson on Mar. 16, 1971. A limitation of these traditional clamps is that the arms will typically move or release pressure upon the work piece when fluid actuating pressure is reduced or lost. Furthermore, the machining tolerances must be accurately controlled among the majority of internal clamp component parts in order to achieve the desired component part motions and to achieve satisfactory clamping forces.

In accordance with the present invention, the preferred embodiment of the apparatus performs as a clamp with moveable members which generate a toggle action, or performs as a gauging device having a pair of moveable members which mechanically abut against each other to maintain, at least temporarily, a locking position of an arm even when actuating fluid pressures have been decreased or lost. In another aspect of the present invention, a lost linear motion device is provided in order to maximize arm unlocking forces. A uniquely configured slide, crank and hub are provided in a further aspect of the present invention. Methods of operating and assembling the present invention apparatus are also provided.

The powered clamp and gauging apparatus of the present invention is highly advantageous over conventional clamps since the present invention has a tapered self-locking feature for holding a rotated arm even after loss of piston actuating pressures. Thus, work pieces will not fall from their locked and/or gauged positions, thereby preventing work piece and equipment damage. Another advantage of the present invention apparatus is that slotted coupling between moving members allow for a toggle action which magnifies clamping forces without adversely affecting apparatus accuracy for gauging. The present invention is further advantageous by employing the specifically configured slide and crank in combination with a lost motion device in order to maximize unlocking forces while reducing the need for accurate component part machining tolerances. These more relaxed machining and part tolerances provide for lower cost manufacturing and reduced part scrappage while improving clamping and gauging force efficiencies and performance. The present invention apparatus is fully sealed and permanently lubricated and is therefore suitable for use in even the most contaminated environments. This powered clamp and gauging apparatus is also very compact and lightweight, and can have its clamping or gauging arm easily preset to any one of a number of positions. Additional advantages and features of the present invention will become apparent from the following description and dependent claims, taken in conjunction with the accompanying drawings.

BRIEF DESCRIPTION OF THE DRAWINGS

FIGS. 13B–16 are a series of diagrammatic side views showing various operating positions of the preferred embodiment of the present invention;

DETAILED DESCRIPTION OF THE PREFERRED EMBODIMENT

Figure 1:
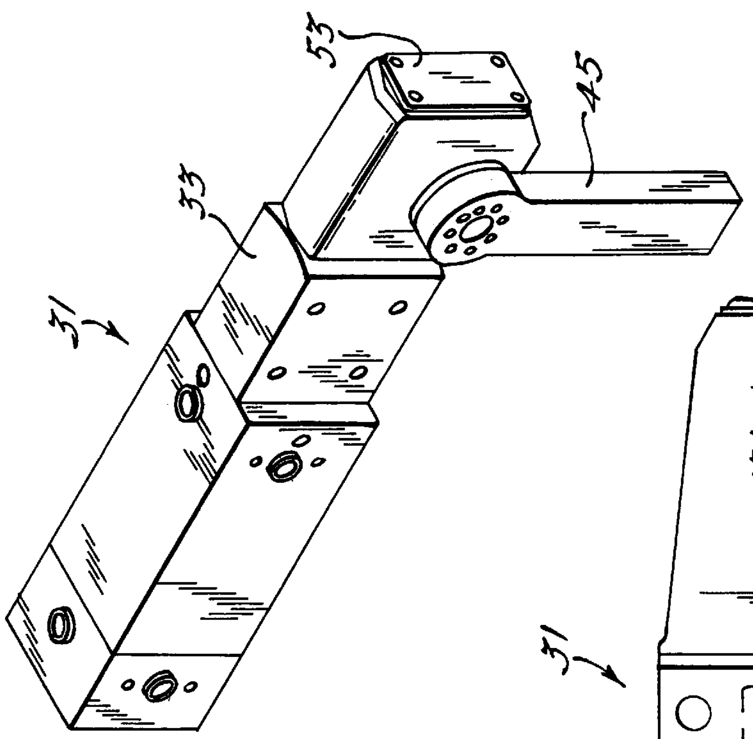
FIG. 1 is a perspective view showing the preferred embodiment of a powered clamp and gauging apparatus of the present invention.
Figure 2:
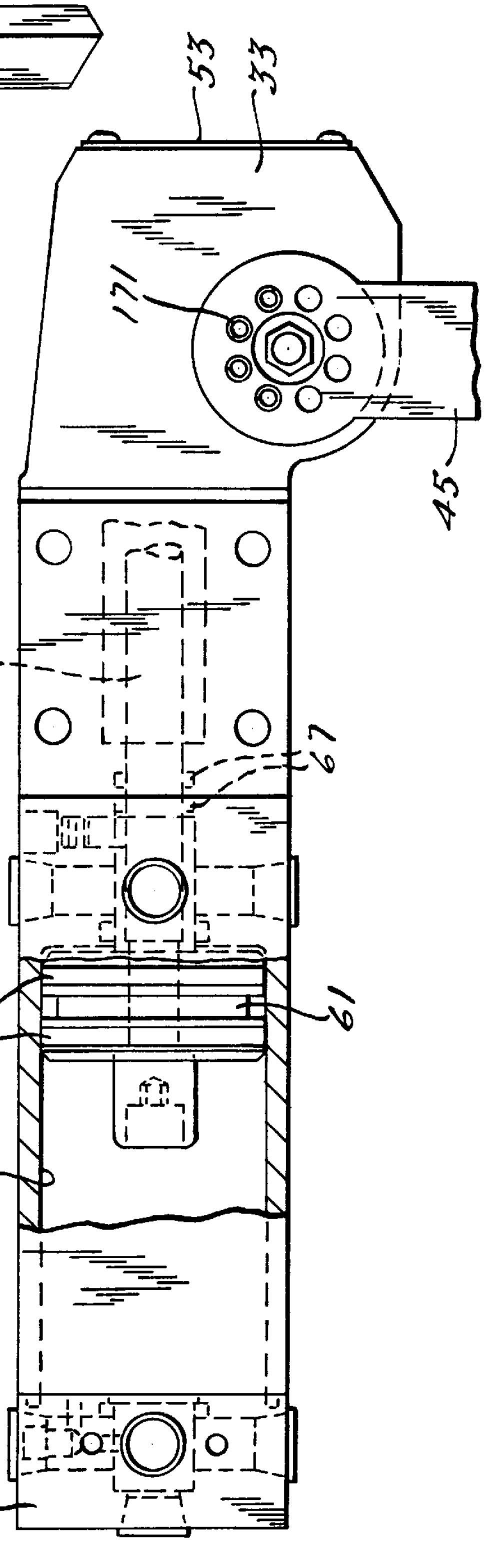
FIG. 2 is a side elevational view, taken partially in section, showing the preferred embodiment of the present invention.

Referring to FIGS. 1–5, the preferred embodiment of a powered clamp and gauging apparatus 31 of the present invention includes a body 33, an actuator 35, a slide 37, a link 39, a crank 41, a hub 43 and an arm 45. Arm 45 is located external to body 33 while the other afore-referenced components are internally disposed within body 33. Arm 45 can be reversed to attach to a face of hub 43 on either side of body 33. Alternately, a pair of arms can be coupled to both faces of hub 43.

Body 33 is forged or extruded and then machined from 6061-T6 aluminum as a unitary hollow part. An end cap 51 is fastened upon a proximal end of body 33 while a 1008/1010 steel front cover 53 is screwed upon an open proximal end of body 33. Silicon seals and elastomeric o-rings, or the like, are disposed between end cap 51, front cover 53 and body 33. After the machining and internal component assembly, a cavity 55 within the distal end of body 33 is then packed with grease and sealed by front cover 53. Thus, the one piece nature of body 33 aids in achievement of a fully sealed and permanently lubricated powered clamp.

Actuator 35 includes a piston 61 and an elongated, cylindrical piston rod 63. Piston 61 is linearly moveable within a longitudinally oriented cylindrical bore 65 machined in body 33. Piston linearly strokes in response to pneumatic or hydraulic fluid pressures forcing piston 61 in either longitudinal direction. Various annular and elastomeric seals 67 are provided between portions of actuator 35 and the coincidental bores within body 33.

As can best be observed in FIGS. 3, 6 and 10–12, slide 37 has a generally cylindrical peripheral surface 71 interrupted by a bifurcated abutting surface 73 and a longitudinally extending internal chamber 75. Abutting surface 73 is preferably machined with a 3° self-locking Morse taper or inclined angle. Other locking taper angles may be used depending upon the specific material coefficients of friction. A transversely oriented and longitudinally elongated slot 77 is cut within a trailing end of slide 37. A distal end of piston rod 53 internally projects within a cylindrical and longitudinally oriented passageway 79 in the trailing end of slide 37. The distal end of piston rod further has a transversely oriented cylindrical hole 81. A roll pin 83 movably extends through transverse slot 77 in slide 37 and firmly engages with hole 81 in piston rod 63. Hence, lost linear motion or travel, of approximately 0.250 inches, is accomplished between actuator 35 and slide 37. In other words, piston 61 can begin return stroke movement prior to coincidental following rearward movement of slide 37.

A leading end of slide 37 additionally has transversely oriented cylindrical openings 91 intersecting with internal chamber 75. Slide is made from 41L40 CF material which is hardened and ground to RcC 38–42. Piston rod 63 is made from 1045 chrome plated material with a threaded proximal end for engagement with the piston. Locktite adhesive is applied to the threads. Although not preferred, transverse slot 77 and transverse cylindrical openings 91 can be reversed between the piston rod and slide.

Referring now to FIGS. 3 and 7–9, an aperture 101 within a first end of elongated link 39 is aligned between openings 91 of slide 37 for engagement by a 12L14 CDS material link pin 103 for pivotable movement thereabout. A pressft pin 105, set screw or the like engages a circumferential groove 107 to affix link 39 to link pin 103. An aperture 109 in the opposite end of link 39 is aligned between a pair of driven journalling openings 111 within parallel walls 113 of crank 41. Openings 91 within slide 37 are transversely elongated opposite from transverse slot 77. Furthermore, openings 91 have a vertically elongated dimension greater than the diameter of link pin 103; this allows for a toggle action as will be discussed in greater detail hereinafter. Alternately, openings 91 may have a circular configuration while aperture 101 of link 39 is given an elongated slot-like shape. Another link pin 115 and fastening pin 117 pivotally affix link 39 to a driven journalling segment of crank 41. Link 39 is preferably made from 4140 HRS material.

Crank 41 further has a seat 121 from which said walls 113 extend in a bifurcated manner. A 3° self-locking Morse tapered contact surface 123 upwardly projects from seat 121 while second and third 30 self-locking Morse tapered contact surfaces 125 upwardly extend near the driven journalling segment of crank 39. A partially circular trough 127 spans between contact surfaces 123 and 125. A semi-circular recess 129 is disposed in an opposite edge of crank 41 from contact surfaces 123 and 125. Moreover, four orifices 131 transversely extend through seat 121 and are arranged in a generally semi-circular pattern in relation to each other and border about recess 129. Crank 41 is preferably machined from 6150 HRS material which is hardened and ground to Rc 50–54.

Figure 3:
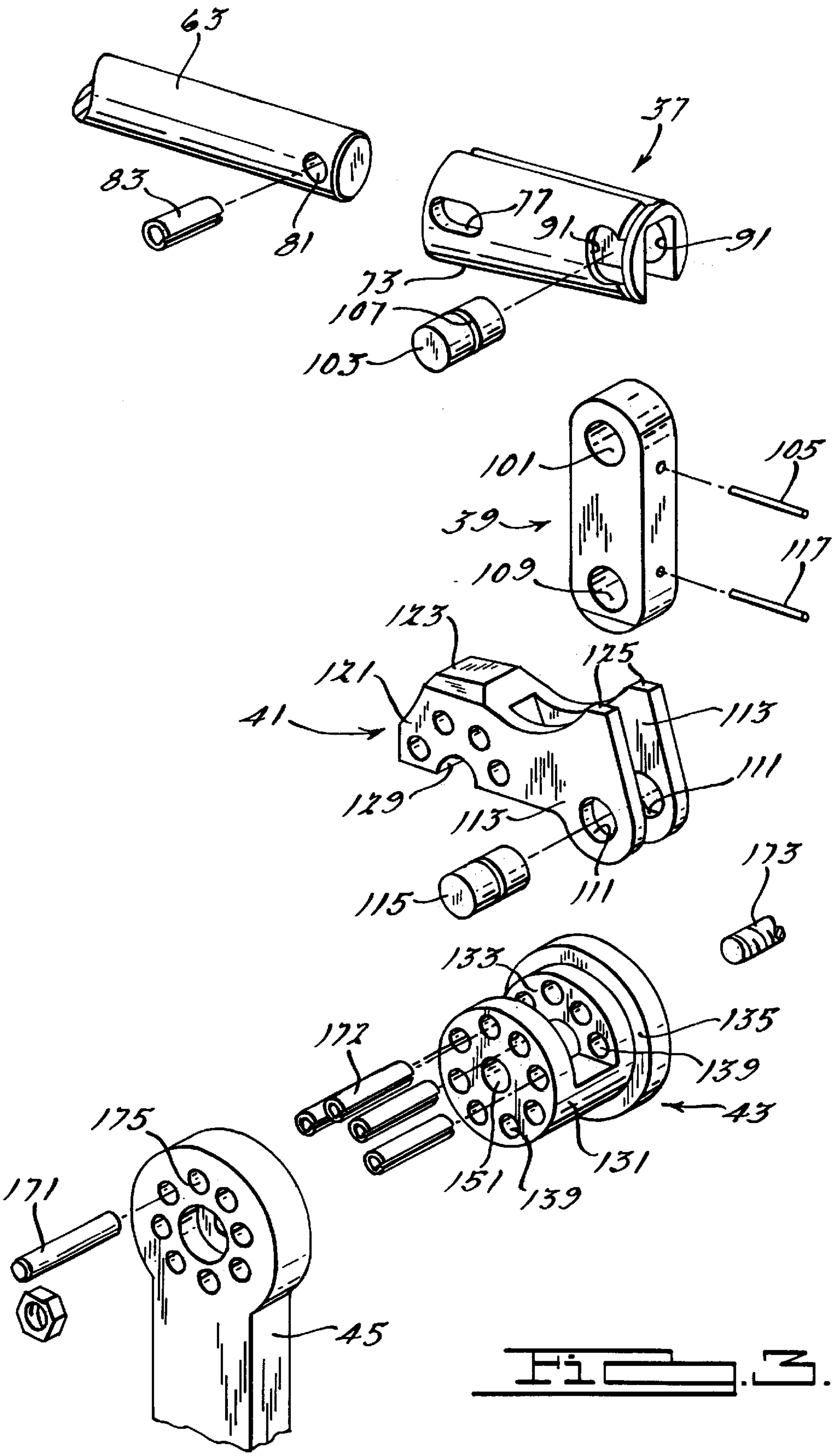
FIG. 3 is an exploded perspective view showing the preferred embodiment of the present invention.
Figure 4:
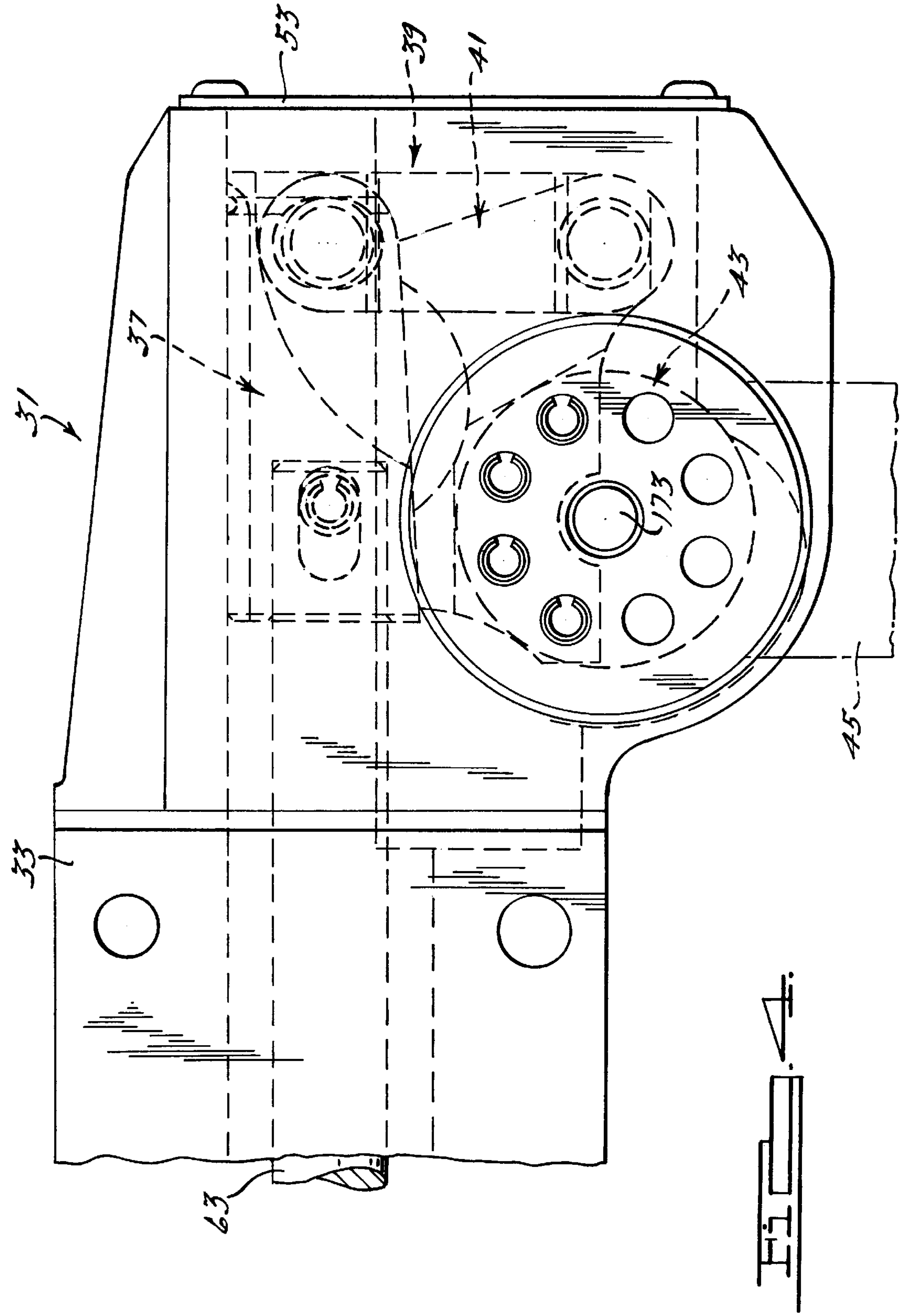
FIG. 4 is a fragmentary side elevational view showing the preferred embodiment of the present invention.
Figure 5:
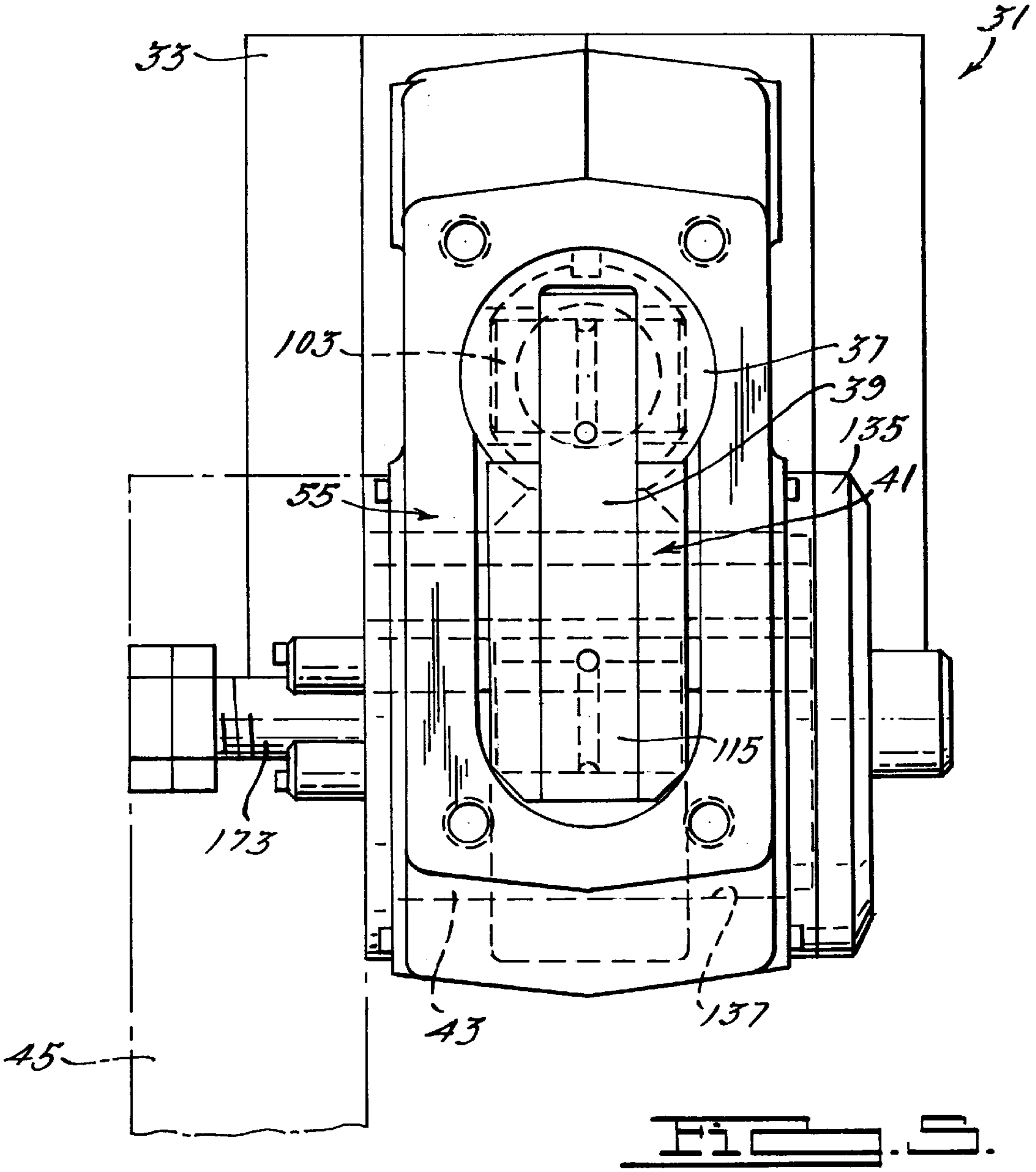
FIG. 5 is an end elevational view showing the preferred embodiment of the present invention with a cover plate removed.
Figure 6:
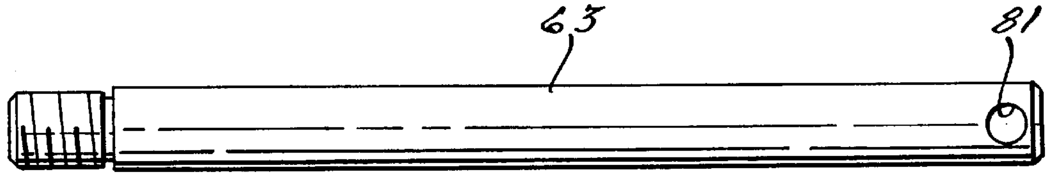
FIG. 6 is a side elevational view showing a piston rod employed in the preferred embodiment of the present invention.
Figure 7:
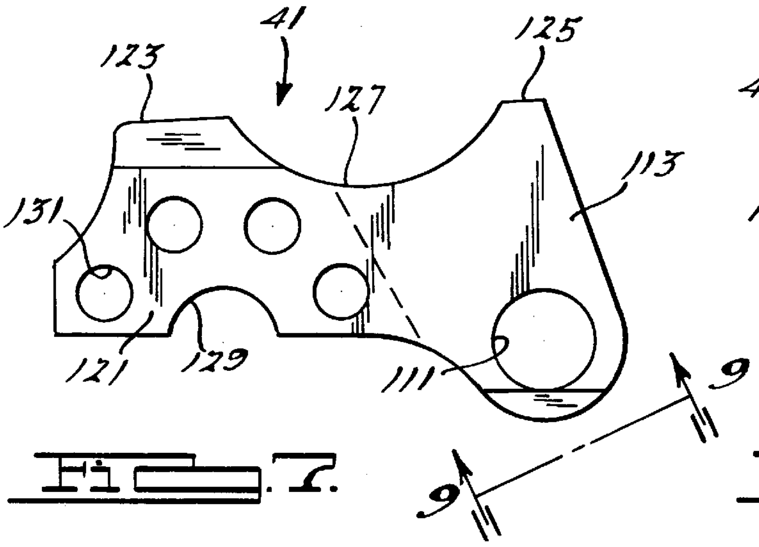
FIG. 7 is a side elevational view showing a crank employed in the preferred embodiment of the present invention.
Figure 8:
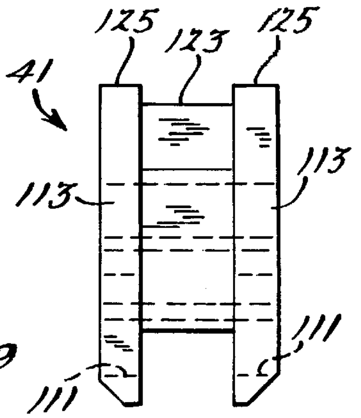
FIG. 8 is an end elevational view showing the crank employed in the preferred embodiment of the present invention.
Figure 9:
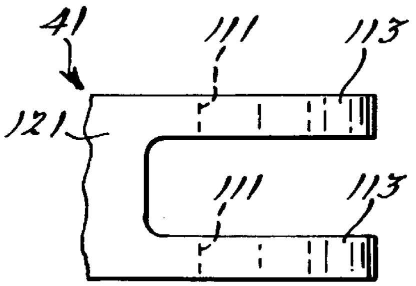
FIG. 9 is a fragmentary true elevational view, taken in the direction of arrow 9—9 in FIG. 7, showing the crank employed in the preferred embodiment of the present invention.
Figure 10:
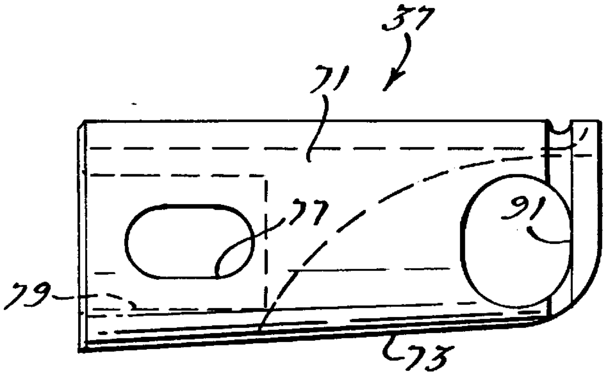
FIG. 10 is a side elevational view showing a slide employed in the preferred embodiment of the present invention.
Figure 11:
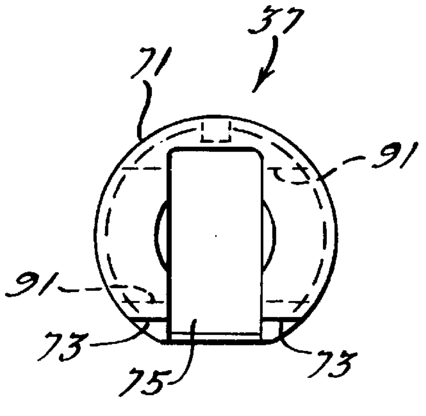
FIG. 11 is a bottom elevational view showing the slide employed in the preferred embodiment of the present invention.
Figure 12:
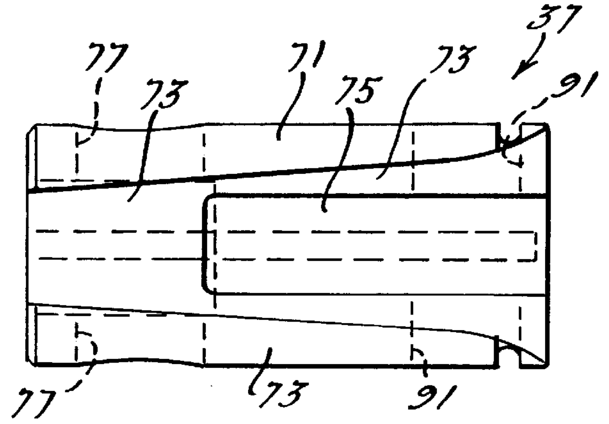
FIG. 12 is an end elevational view showing the slide employed in the preferred embodiment of the present invention.

As is shown in FIGS. 3–5, hub 43 has a cylindrically shaped peripheral surface 131 partially split by a laterally extending channel 133. Hub 43 further has an annular flange 135 outwardly projecting from an outboard face. Peripheral surface 131 of hub 43 is rotatably received within a matching cross bore 137 through side walls of body 33. Eight circularly oriented holes 139 are drilled through both faces of hub 43 and the portion of hub 43 adjacent to channel 133. A central hole 151 is also drilled through the entire hub 43. Hub 43 is preferably machined from 41 L40 CF material.

Arm 45 is affixed to a face of hub 43 through four dowel pins 171 and a screw or stud 173. Screw is received within central hole 151 of hub 43. Screw 173 engages with a locking nut and sandwiches a washer on its opposite end. Nut is torqued to approximately 45 pounds-foot. Recess 129 of crank 41 is designed to provide clearance around the shaft of screw 173. Arm 45 has a set of apertures 175, arranged in a generally circular pattern with respect to each other, for receiving ends of dowel pins 171 when arm 45 is placed in its preselected orientation in relation to hub 43 and body 33. Four roll pins 172 also retain hub 43 to crank 41. Arm 45 is preferably machined from 6150 HRS RcC 50–54 material. A 4150 HT material hub cap is placed over the opposite side of cross bore 137, the washer and flange 135 of hub 43 if a second arm is not attached.

Figure 17:
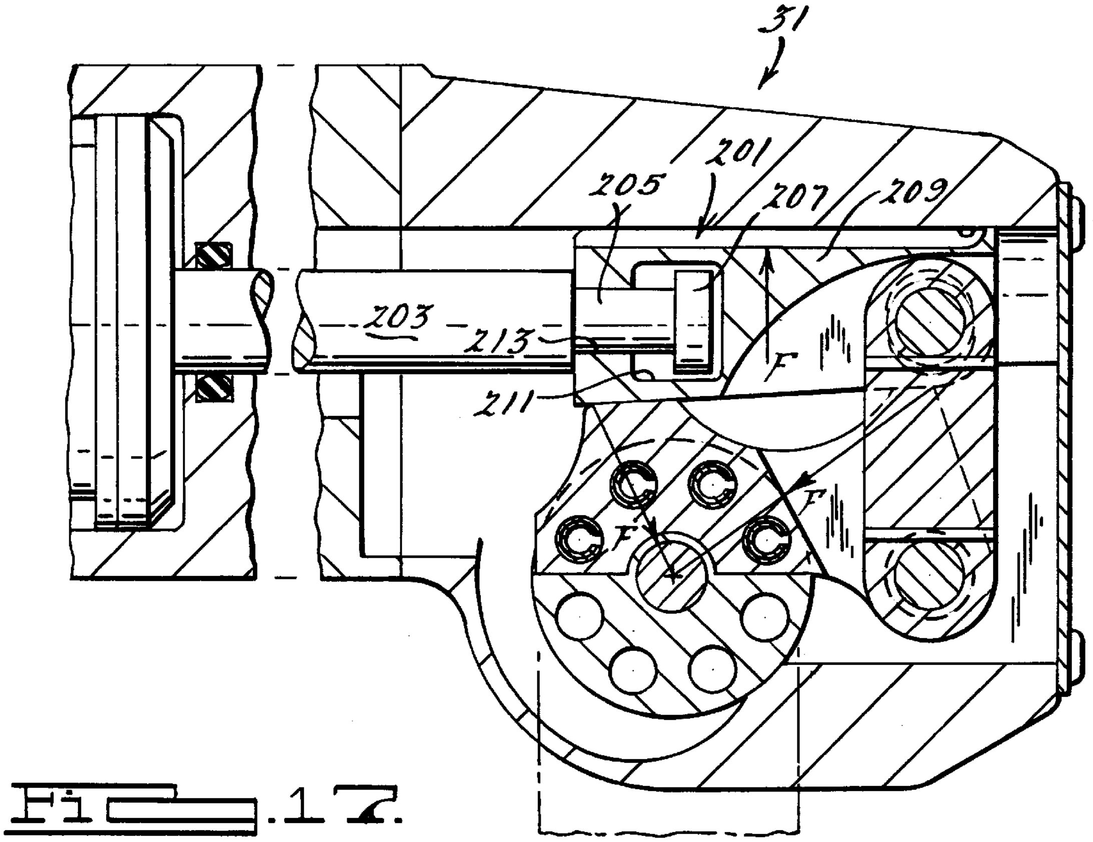
FIG. 17 is a diagrammatic side view showing a first alternate embodiment of the present invention.

A first alternate embodiment lost linear motion device 201 employed within the present invention powered clamp 31 is illustrated in FIG. 17. In this embodiment, a piston rod 203 has a distal end with a constricted shaft 205 depending therefrom upon which is mounted a transversely expanded, cylindrical head 207. The mating slide 209 has a partially cylindrical receptacle 211 in its trailing end from which longitudinally extends a shaft passageway 213. Head 207 is placed within receptacle 211 and shaft 205 is placed within passageway 213. Furthermore, head 207 has a transversely larger dimension than passageway 213. The lost linear motion function is accomplished by receptacle 211 having a larger longitudinal dimension than that of head 207.

Figure 13A:
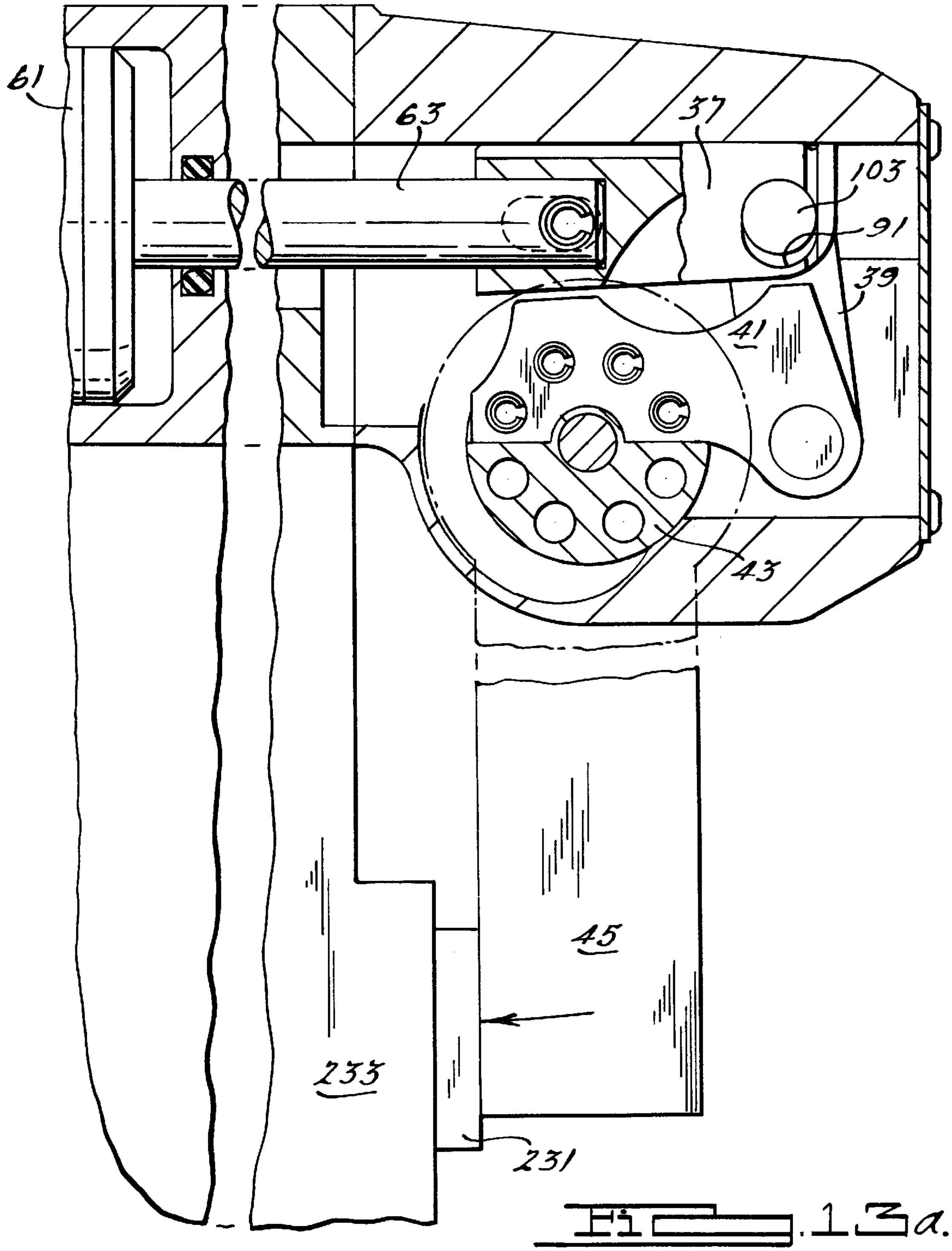
FIGS. 13A is a diagrammatic side view showing an arm employed in the preferred embodiment of the present invention disposed in a toggled clamping position.
Figure 13B:
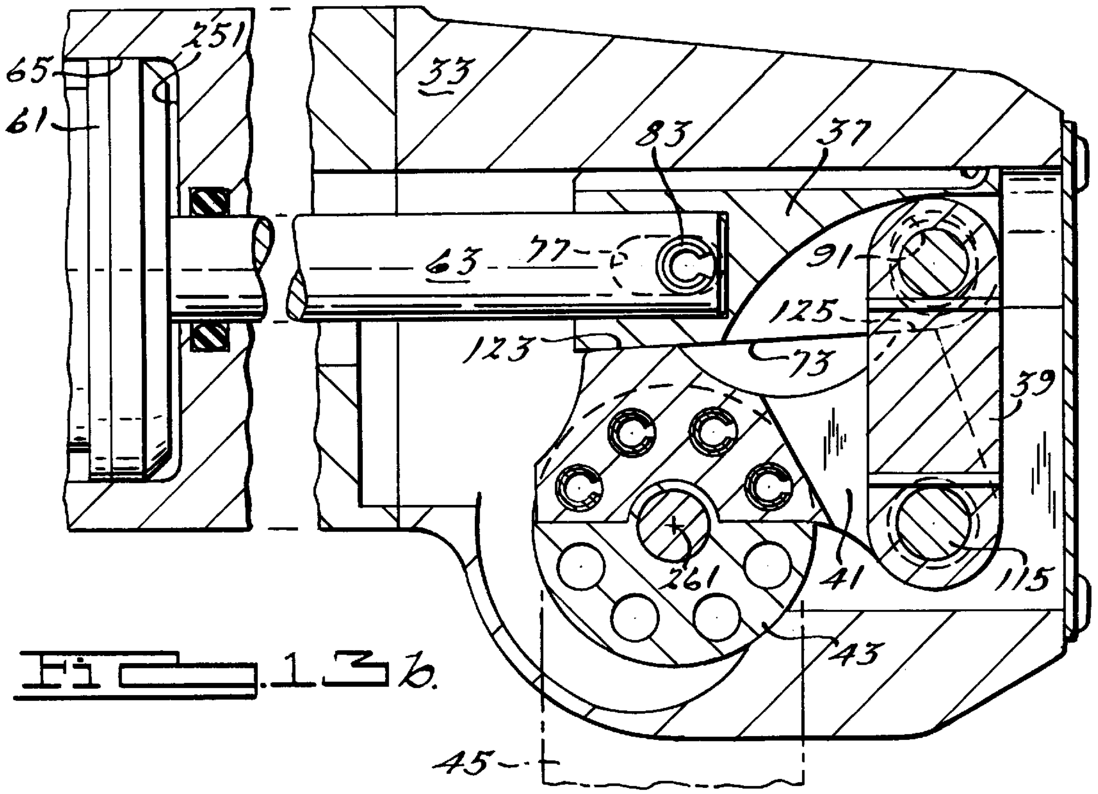

The sequence of operational steps can be observed with reference to FIGS. 13B–16. Specifically, FIG. 13B shows arm 45 disposed in a locking position wherein a work piece would be firmly held for a highly repeatable and accurate gauging function. In this locking position, piston 61 is near but does not bottom out or contact against a forward face 251 of bore 65. There is a longitudinal gap between piston 61 and face 251. In this forward piston position, slide 37 is linearly stopped prior to stoppage of piston 61 due to abutting against crank 41, such that piston rod 63 and pin 83 are moved toward a leading end of transverse slot 77 of slide 37. In other words, piston 61 advances until crank 41 engages in a frictionally self-locking manner against slide 37. Therefore, slide 37 becomes wedged between crank 41 and upper wall of body 33 as a result of the inclined tapers.

Concurrently, link 39 is oriented in a generally vertical direction (as illustrated) while crank 41 is disposed in a locked position. In this locked position, contact surfaces 123 and 125 press against tapered abutting surface 73 of slide 37 in a self-locking manner. Therefore, crank 41 maintains the locked position of hub 43 and arm 45 thereby preventing them from moving even if piston actuating pressures are reduced or lost. This is much more accurate and repeatable than having a rotating member simply abut against the body or some other fixed element.

FIG. 13A shows a full clamping position similar to that of FIG. 13B except that the clamping action of arm 45 retains a workpiece 231 against a work surface 233 and self-locking of crank 41 against slide 37 is prevented. However, a force multiplying toggle motion is achieved by link 39 and link pin 103 rising to the top of elongated openings 91 of slide 37. Hence, the present invention provides for both accurate gauging and strong clamping functions within a single apparatus.

Figure 14:
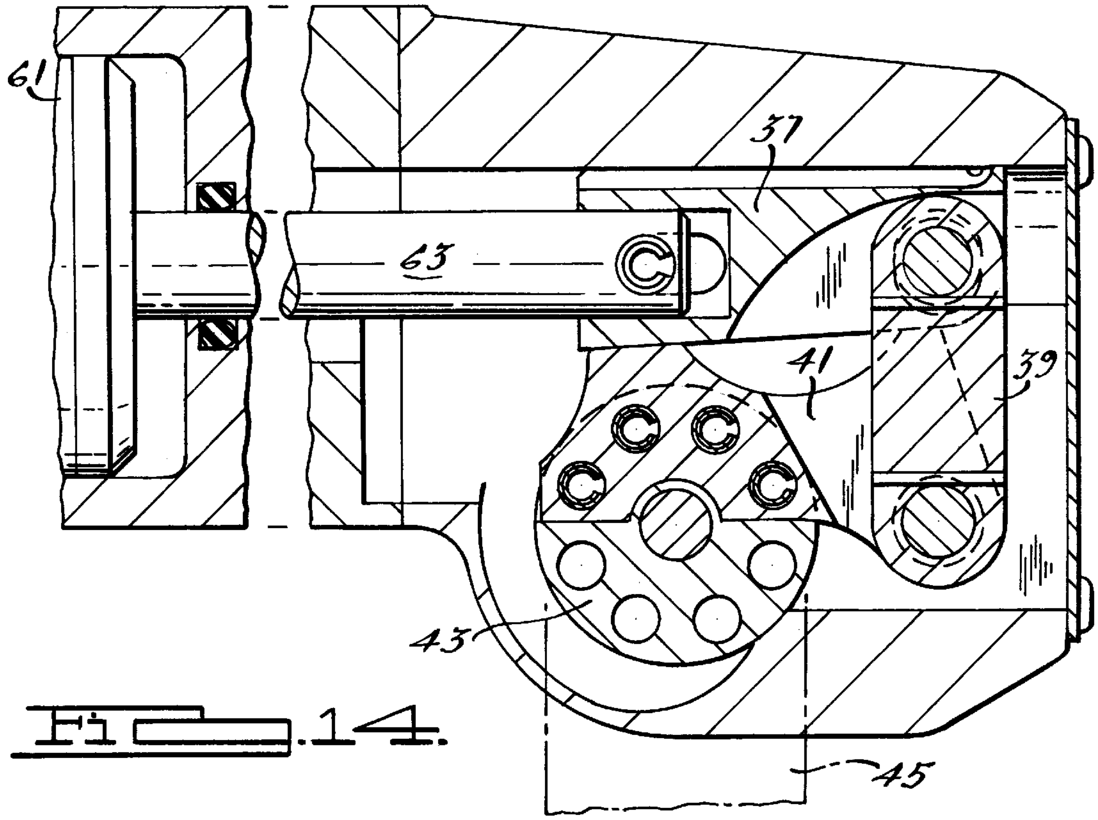

By comparing the component positions of FIG. 14 to those of FIG. 13B, it can be observed that piston 61 and piston rod 63 are linearly pulled rearward without a coincidental movement of slide 37. This is achieved by use of the lost motion device coupling piston rod 63 to slide 37. Such a lost motion device is deemed advantageous since the inclined abutting surface angle on slide 37 is a self-locking taper that needs a relatively large force for unlocking crank 41 from slide 37 and overcoming the static friction therebetween. The free travel or lost linear motion between piston rod 63 and slide 37 during the return piston stroke provides a force multiplying snap or jerk action when pin 83 or headed rod (see FIG. 14) engages the trailing end of transverse slot 77 thereby unlocking the self-locking mechanism.

Figure 15:
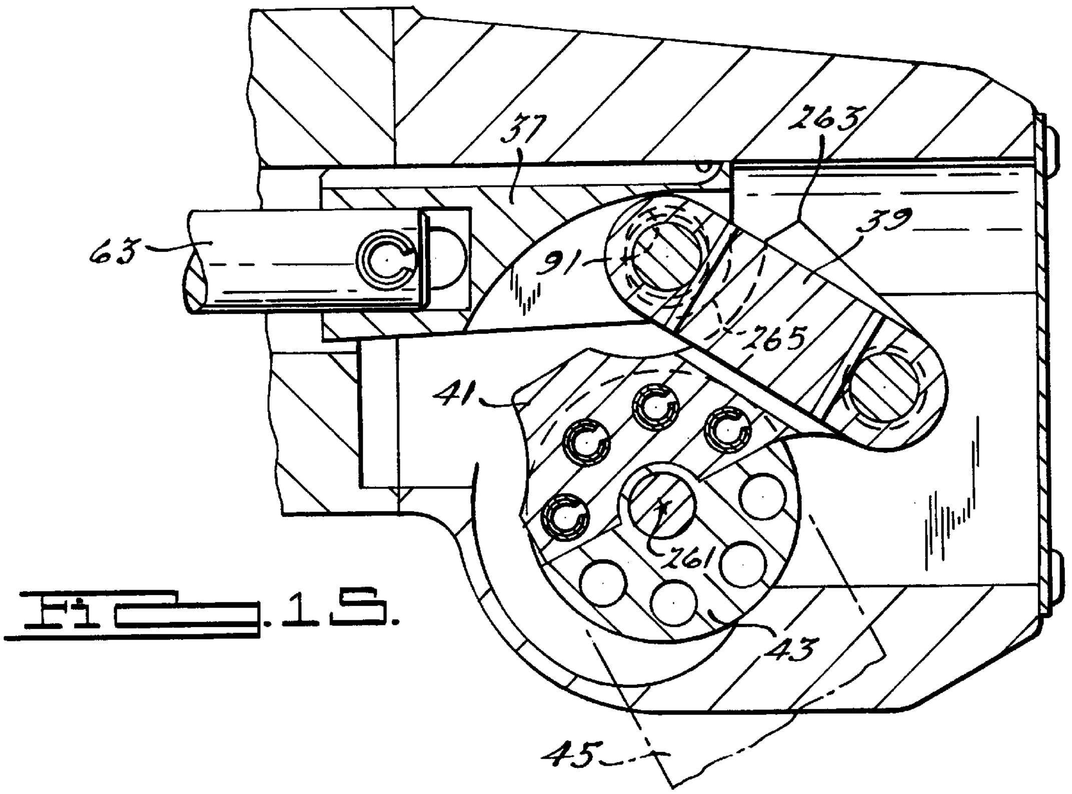

A comparison of FIGS. 14 and 15 illustrate the coincidental return stroke movement of slide 37 and piston rod 63. This linearly sliding movement of slide 37 causes a toggling action (for clamping functions) or pivoting of link 39 which, in turn, pivots crank 41, hub 43 and arm 45 about a pivot axis 261 through center hole 151 (see FIG. 3). Vertically slotted openings 91 allow link 39 to vertically move while encouraging a crank contact point 263 to pivotally track and clear around a radius 265 on slide 37.

Figure 16:
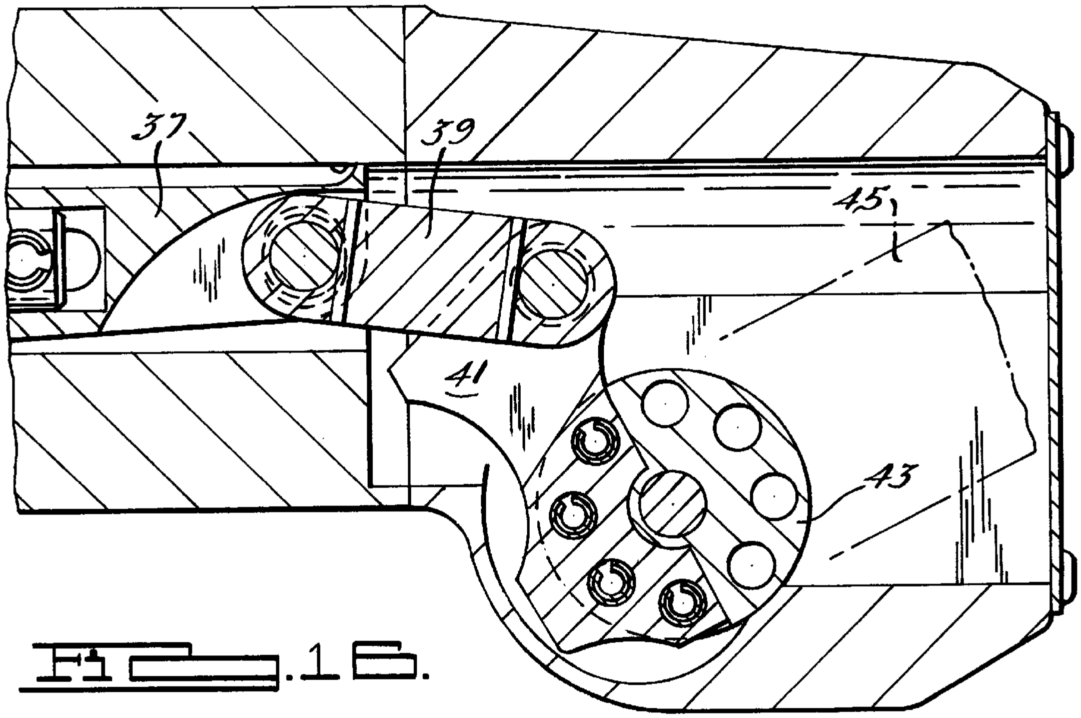

FIG. 16 illustrates piston rod 63 and slide 37 in their fully rearward stroke positions. Consequently, arm 45 is fully rotated away from its locked position. When pivoted back toward the position of FIG. 13B, link 39 rotates crank 41 close to its final position. Slotted openings 91 in slide 37 allow contacting surfaces 123 and 125 of crank 41 to contact and abut against abutting surface 73 of slide 37. This forces crank 41 into the self-locking position wherein torquing forces are equally balanced between contacting surfaces 123 and 125 in relation to abutting surface 73 as vectored away from arm pivot axis 261. Thus, the lost motion device and slots allow for considerably wider part manufacturing tolerances as compared to conventional powered clamp components while the present invention powered apparatus still produces a precision and highly repeatable lock up gauging mechanism and powerfully toggled clamp.

The apparatus of the present invention is preferably assembled as follows: First, the components are formed then machined. Second, the hub is inserted through the cross bores of the unitary body side walls. Third, the piston rod, slide, link and a link pin are preassembled outside of the body as a subassembly. Next, the subassembly is inserted through the front opening of the body. Fifth, the crank is placed into the hub lateral channel by way of the body front opening whereafter, the crank is pinned to the hub. Sixth, the piston is inserted into the piston bore and then joined to the piston rod. Seventh, the end cap is screwed onto the body. Subsequently, after insertion of grease into the body cavity, the front cover is screwed onto the body. Finally, the arm is positioned in relation to the body wherein the dowels are inserted and nut is torqued upon the screw.

Figure 18:
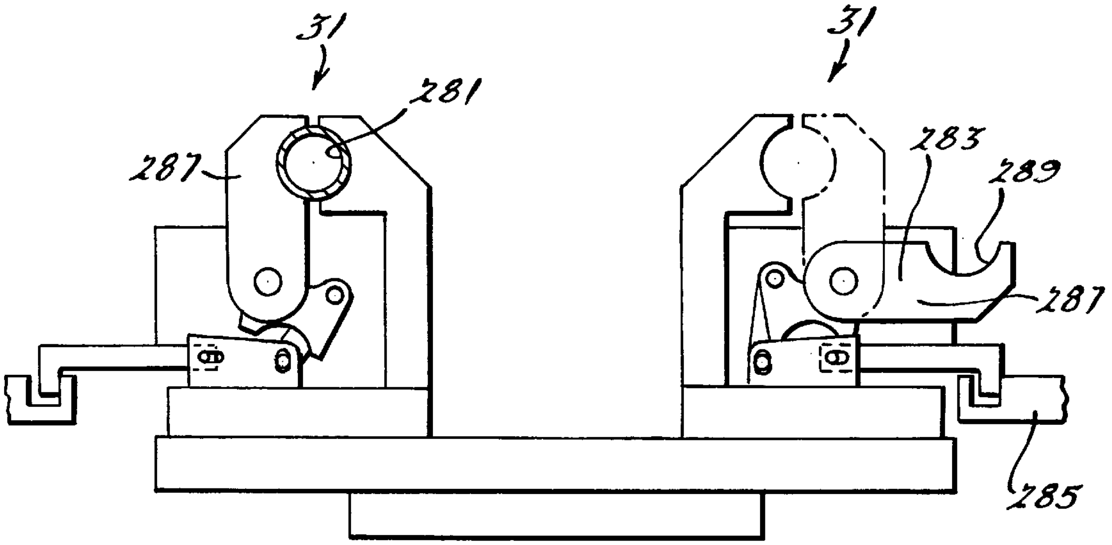
FIG. 18 is a diagrammatic side view showing a second alternate embodiment of the present invention.

Referring now to FIG. 18, a second alternate embodiment of the present invention powered clamp 31 can be fastened to a moving table, such as a rotary or horizontally sliding table, for retaining a workpiece such as a pipe 281. Accordingly, a moving arm 283, coupled to a hub, crank, link, slide and actuator 285, holds pipe 281 against a stationary arm 287. Distal ends of arms 283 and 287 are provided with semi-cylindrical recesses 289 for engagably receiving and holding pipe 281.

Figure 19:
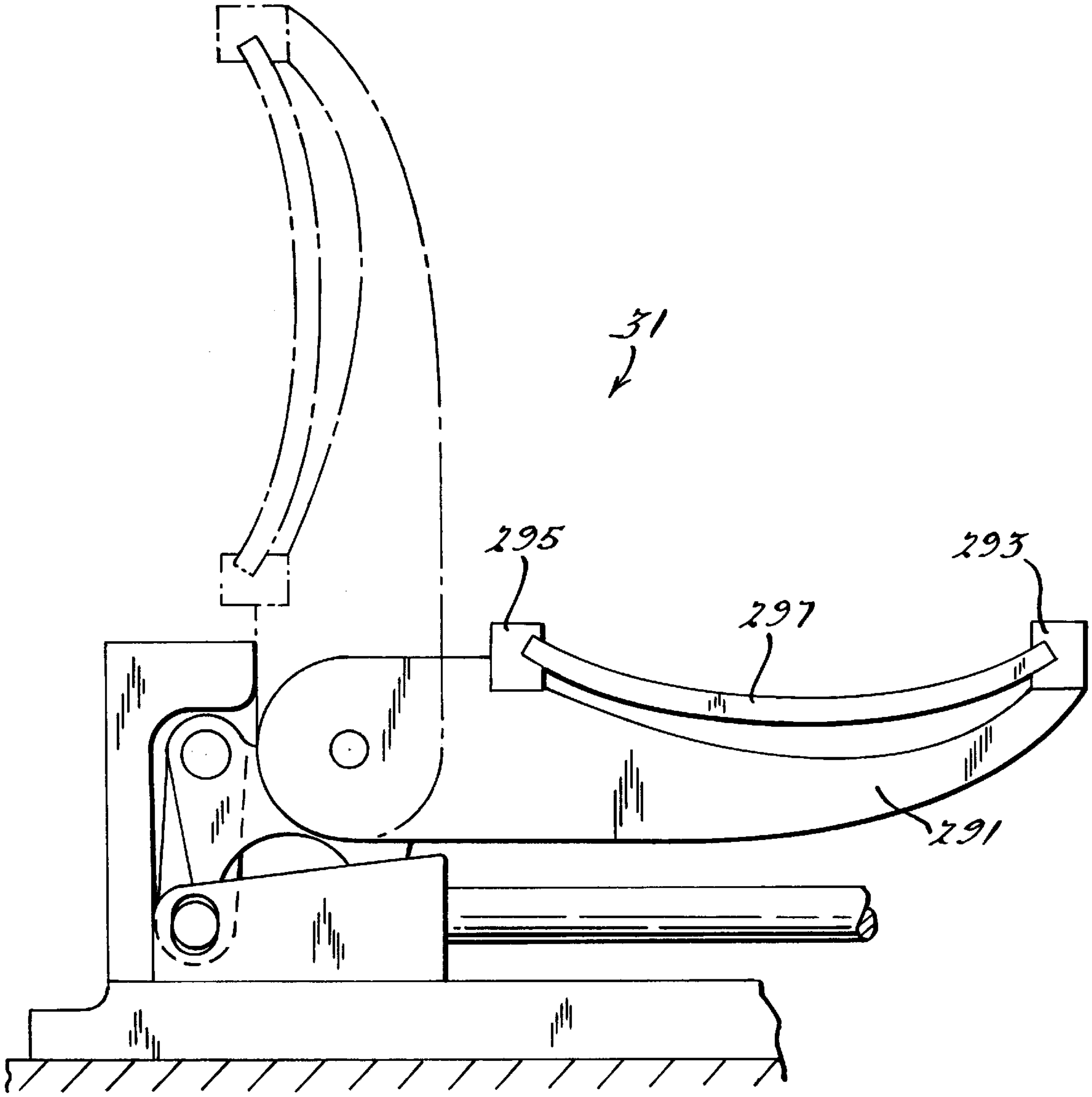
FIG. 19 is a diagrammatic side view showing a third alternate embodiment of the present invention.

A third alternate embodiment of the powered clamp 31 of the present invention can be observed in FIG. 19. In this exemplary embodiment, an elongated moving arm 291 has a pair of opposed C-shaped gripping elements 293 and 295 which are suitably configured to retain an automotive vehicle body side panel 297 such as a door panel, quarter panel, front fender or the like. Arm 291 lifts and locks, or locates panel 297 for further gauging or machining operations, or assembly. Arms 291 and 283 (see FIG. 18) are locked and moved by power transmission components as previously discussed heretofore with regard to the preferred embodiment. Furthermore, any of these disclosed present invention embodiments can be used to provide a precision pallet gage lock, a die set up position latch and safety lock, a hand or manual operated clamp part locator with a manually actuable pull handle, a taper lock mechanism for operation of a gear and rack to position and lock a slide, a folding furniture lock, window locks, precision valve opening for flow measurement, and precise opening and closing a pair of opposing mechanisms.

The powered clamp of the present invention has further advantageous features. The powered clamp of the present invention has a single style hub for left, right or dual arm clamps. This hub allows arm position changing without disassembly of the internal mechanism. Any arm can be mounted in any of the standard eight positions at 450 increments or, alternately, other specially machined locations and arm angles can be provided. Additionally, the present invention encourages simplified arm mounting or changeover using the single socket head cap screw, thereby eliminating pressed-on arms and jack screws, or set screw retention. The traditional necessity for a precision octagon broached hole in the arm is also eliminated. Thus, the present invention apparatus exhibits increased load bearing capability at a lower manufacturing cost compared to the octagon hub and arm patterns. The dowel pins may also be made as shear pins for protection of equipment.

While various embodiments of this powered clamp and gauging apparatus have been disclosed, it will be appreciated that various modifications may be made without departing from the present invention. For example, the slide, link, crank, hub and arm may be partially or totally disposed external from a body. Although not achieving many of the performance, cost and weight benefits of the present invention, various other actuating mechanisms may be employed to move the slide such as electric motors, internal combustion motors or manual actuation in combination with a rack and pinion mechanism, gears, pulleys, screw drives or the like. Moreover, the moving arm may have many differing shapes for engaging or holding a variety of work pieces or instruments. The specific shapes and moving motions of the slide, link and crank can be modified or combined while maintaining various of the other novel aspects of the present invention. Various materials and manufacturing processes have been disclosed in an exemplary fashion, however, other materials and processes may of course be employed. It is intended by the following claims to cover these and any other departures from the disclosed embodiments which fall within the true spirit of this invention.

The invention claimed is:

1. A clamp and gauging apparatus comprising:

a body;

a slide linearly movable in relation to said body, said slide having an abutting surface; and a crank coupled to said slide for pivotable movement in response to linear movement of said slide, said crank having a first contact surface operably located against said abutting surface of said slide thereby frictionally locking said crank to said slide.

2. The clamp and gauging apparatus of claim 1 further comprising an arm pivotally coupled to said crank, said arm being held in a locked position when said contact surface of said crank is located against said abutting surface of said slide, at least a portion of said crank pivoting about a fixed pivot axis.

3. The clamp and gauging apparatus of claim 2 further comprising:

a link coupling said slide to said crank;

a first pin pivotally coupling a first end of said link to said slide; and a second pin pivotally coupling a second end of said link to a driven journalling segment of said crank offset from a main pivot axis of said crank.

4. The clamp and gauging apparatus of claim 3 further comprising:

a second contact surface being disposed on said crank adjacent to said driven journalling segment, said first contact surface of said crank being disposed adjacent to said arm, said contacting surfaces being separated from each other by a trough; and a pair of walls depending from a unified seat of said crank, said second end of said link movably fitting between said pair of walls of said crank.

5. The clamp and gauging of claim 3 wherein a leading end of said slide has an opening oversized in a transverse direction beyond an outer diameter of said first pin.

6. The clamp and gauging apparatus of claim 1 further comprising a linearly moveable fluid powered actuating member being coupled to said slide by a lost linear motion device whereby said actuating member is movable by a predetermined amount of linear distance prior to coincidental movement of said slide.

7. The clamp and gauging apparatus of claim 1 further comprising a partially cylindrical hub coupling said crank to an arm through a set of pins located around a central threaded shaft and nut fastener assembly.

8. A clamp and gauging apparatus comprising:

a body;

a first member movable in a first direction relative to said body, said first member having an abutting surface; and a second member movable in a second direction, said second member having a first contact surface;

an actuator operably driving said first member; and an arm at least partially extending from said body, said arm being movable in response to movement of said second member, said arm being held in a locked position when said first contact surface of said second member is located against said abutting surface of said first member.

9. The clamp and gauging apparatus of claim 8 further comprising:

a link coupling said first member to said second member;

a first pin pivotally coupling a first end of said link to said first member; and a second pin pivotally coupling a second end of said link to a driven journalling segment of said second member offset from a main pivot of said second member.

10. The clamp and gauging apparatus of claim 9 further comprising:

a second contact surface being disposed on said second member adjacent to said driven journalling segment, said first contact surface of said second member being disposed adjacent to said arm, said contacting surfaces being separated from each other by a trough; and a pair of walls depending from a unified seat of said second member, said second end of said link movably fitting between said pair of walls of said second member.

11. The clamp and gauging apparatus of claim 9 wherein a leading end of said slide has an opening oversized in a transverse direction beyond an outer diameter of said first pin.

12. The clamp and gauging apparatus of claim 8 further comprising a linearly moveable fluid powered actuating member being coupled to said first member by a lost linear motion device whereby said actuating member is movable a predetermined amount of linear distance prior to coincidental movement of said first member.

13. The clamp and gauging apparatus of claim 8 further comprising a partially cylindrical hub coupling said second member to an arm through a set of pins located around a central threaded shaft and nut fastener assembly.

14. The clamp and gauging apparatus of claim 8 wherein said abutting surface is inclined in relation to a longitudinal axis of said body thereby creating a self-locking taper.

15. The clamp and gauging apparatus of claim 8 wherein said first member is linearly movable within said body and said second member is pivotally moveable within said body.

16. The clamp and gauging apparatus of claim 15 wherein said body is a unitary piece having bores formed therein, said body further has a cover plate attached to a hollow end closest to said arm.

17. A apparatus comprising:

a powered actuator;

a first member movably driven by said actuator, an inclined angled abutting surface being disposed on said first member; and a workpiece retaining arm movably coupled to said first member by a second member having an angled contact surface generally matching that of said abutting surface;

said abutting surface engaging said contact surface to provide a self-locking stop thereby frictionally maintaining said arm in a predetermined position until said angled surfaces are disengaged.

18. The apparatus of claim 17 further comprising:

a link coupling said first member to said second member;

a first pin pivotally coupling a first end of said link to said first member; and a second pin pivotally coupling a second end of said link to a driven journalling segment of said second member offset from a main pivot of said second member.

19. The apparatus of claim 17 further comprising a linearly moveable fluid powered actuating member being coupled to said first member by a lost linear motion device whereby said actuating member is movable a predetermined amount of linear distance prior to coincidental movement of said first member.

20. The apparatus of claim 17 wherein said first member is linearly movable within said body and said second member is pivotally moveable within said body.

21. A powered clamp and gauging apparatus comprising a slide having a partially cylindrical peripheral surface and a longitudinally oriented internal chamber, said peripheral surface further having at least one generally flat abutting surface inclining in a longitudinal direction thereby creating a self-locking taper.

22. The powered clamp and gauging apparatus of claim 21 wherein said slide has a transversely oriented opening at a leading end which intersects said internal chamber.

23. The powered clamp and gauging apparatus of claim 22 further comprising a link having a first end pivotally coupled to said opening and movably located within said internal chamber of said slide.

24. The powered clamp and gauging apparatus of claim 23 further comprising a crank pivotally coupled to a second end of said link, said crank having a self-locking tapered contact surface operably engaging with said abutting surface of said slide thereby frictionally locking said crank against said slide.

25. The powered clamp and gauging apparatus of claim 22 further comprising lost motion means for engaging with a piston rod being disposed upon a trailing end of said slide.

26. A powered clamp comprising a slide, a substantially rigid piston rod being movable in a linear manner in a longitudinal direction, a fluid actuated piston operably driving said piston rod, a crank pivoting in response to linear movement of said slide a lost linear motion device coupling said piston rod to said slide whereby said piston rod is movable a predetermined amount of linear distance prior to coincidental movement of said slide.

27. The powered clamp of claim 26 further comprising a one piece body, said piston, piston rod, slide and crank being disposed in said body.

28. The powered clamp of claim 27 further comprising:

a link coupling said slide to said crank; and an arm being pivotally coupled to said crank;

wherein said crank has a contact surface operably located against an abutting surface of said slide, said crank and said arm are held in a locked position when said contact surface of said crank is located against said abutting surface of said slide.

29. The powered clamp of claim 26 further comprising an arm removably mounted to an external surface of a body of said clamp.

30. The powered clamp of claim 26 wherein said lost linear motion device includes:

a longitudinally oriented slot located within at least one member taken from a group consisting of: said slide and said piston rod; and a pin coupling a distal end of said piston rod to said slide by way of said slot.

31. The powered clamp of claim 26 wherein said lost linear motion device includes:

an internal receptacle and a relatively constricted passageway extending from said cavity and both being located upon one member taken from a group consisting of: said slide and said piston rod; and a shaft and a transversely enlarged head extending from said shaft depending from the other member taken from the group consisting of: said slide and said piston rod;

wherein said head is received within said receptacle and said shaft is received within said passageway, said receptacle is linearly larger in a longitudinal direction than a longitudinal dimension of said head whereby said shaft and said head can be linearly moved a predetermined amount prior to coincidental movement of the member having said receptacle and said passageway.

32. An apparatus for selectively retaining a workpiece comprising:

a device having a linearly moving powered actuator, a linearly moving slide coupled to said actuator, a link pivotally coupled to said slide, a crank pivotally coupled to said link and an arm pivotally coupled to said crank; and a moving table having said device affixed thereupon.

33. The apparatus of claim 32 wherein movement of said crank against said slide causes said arm to be maintained in a locked position until said slide is retracted.

34. The apparatus of claim 33 wherein said arm is maintained in said locked position even after loss of piston actuating pressures upon said actuator.

35. The apparatus of claim 32 further comprising a hub coupling said arm to said crank.

36. The apparatus of claim 32 further comprising a lost linear motion device coupling said actuator to said slide whereby said actuator is movable by a predetermined amount of linear distance prior to coincidental movement of said slide.

37. The apparatus of claim 32 wherein a distal end of said arm has a generally semi-cylindrical recess for engaging a semi-cylindrical section of said workpiece.

38. The apparatus of claim 32 wherein said moving table moves in a rotary manner.

39. The apparatus of claim 32 wherein said moving table moves in a substantially horizontal sliding manner.

40. An apparatus for positioning or clamping a workpiece, said apparatus comprising: a body, a generally linearly moving powered actuator disposed in said body, a moving slide coupled to said actuator for movement in advancing and retracting directions, a first stop surface disposed on said slide, a link pivotally coupled to said slide, a crank rotatively supported by said body for rotation about a fixed axis and pivotally coupled to said link, and a work-engaging arm coupled to said crank and extending exteriorly from said body, said crank having a second stop surface engagable with said first stop surface on said slide when it is fully advanced in order to limit rotation of said crank and said arm.

41. The apparatus of claim 40 further comprising a driven journalling segment of said crank having a transversely oriented aperture, a seat of said crank having a plurality of transversely oriented holes.

42. The apparatus of claim 41 wherein said second stop surface is defined by at least a pair of contact surfaces upstanding from said periphery of said crank and being separated by a trough.

43. The apparatus of claim 41 further comprising a semi-circular recess disposed within said peripheral surface of said crank and being bordered by said plurality of holes.

44. The apparatus of claim 32 further comprising a hub having a generally cylindrical peripheral surface through which a groove laterally extends, said seat of said crank fittings within said groove of said hub, said hub further having orifices which align with said plurality of holes in said crank, and fasteners extending through at least some of said coincidentally aligned orifices and holes.

45. An apparatus as claimed in claim 40 wherein said crank includes a hub rotatively supported by said body.

46. An apparatus as claimed in claim 45 wherein said arm is fixedly located with regard to said hub by at least one pin disposed in a pin-retaining hole in said arm, said arm having a plurality of said pin-receiving holes therein so that orientation of said arm with regard to said hub can be relatively varied by the choice of holes used.

47. An apparatus as claimed in claim 46 wherein said arm is located with regard to said hub by a plurality of said pins.

48. An apparatus as claimed in claim 47 wherein said arm is affixed to said hub by a threaded fastener.

49. An apparatus as claimed in claim 45 wherein said crank is fixedly connected to said hub by a plurality of pins disposed generally parallel to the rotational axis of said hub.

50. An apparatus as claimed in claim 40 further comprising a guiding surface disposed on said body for guiding the movement of said slide, said guiding surface being arranged to oppose the forces exerted on said slide by said second stop surface when said slide is fully advanced.

51. An apparatus as claimed in claim 50 wherein said guiding surface is disposed on the opposite side of said slide from said first stop surface.

52. An apparatus as claimed in claim 40 wherein said first stop surface is slightly inclined with respect to the as of movement of said slide.

53. An apparatus as claimed in claim 52 wherein the interface between said first and second stop surfaces when said slide is fully advanced is a frictional self-locking taper.

54. An apparatus as claimed in claim 40 further comprising a third stop surface on said crank spaced from said second stop surface which is also engagable with said slide when it is fully advanced.

55. An apparatus as claimed in claim 54 wherein said third stop surface engages said first stop surface.

56. An apparatus as claimed in claim 40 further comprising a source of power and a lost motion connection between said source of power and said actuator.

57. An apparatus as claimed in claim 40 wherein said slide and crank are bifurcated to pivotally receive said link.

58. The apparatus of claim 40 further comprising a pair of walls depending from a seat of said crank, each of said pair of walls having a driven journalling segment pivotally coupled to said link which movably fits between said pair of walls.

59. A clamp and gauging apparatus comprising:

a linearly moveable slide;

a pivotable crank having orifices;

a link coupling said slide to said crank;

a hub having holes;

an arm having transversely oriented apertures;

a threaded shaft centrally fastening said arm to said hub;

a set of fasteners extending through said orifices of said crank and said holes of said hub;

a set of locators extending through said holes of said hub and said apertures of said arm;

whereby an orientation of said arm in relation to said hub can be selectively determined by placement of said locators and whereby said hub is retained to said crank by placement of said fasteners.

60. An apparatus for positioning or clamping a workpiece, said apparatus comprising: a body, a powered slide disposed in said body for movement in advancing and retracting directions, a first stop surface disposed on said slide, a link pivotally coupled to said slide, and a crank supported by said body for rotation about a fixed axis and pivotally coupled to said link, wherein said crank has a second stop surface engagable with said first stop surface on said slide when the latter is fully advanced in order to limit rotation of said crank and said arm.

61. A clamp and gauging apparatus comprising:

a body;

a powered slide linearly movable in relation to said body, said slide having an abutting surface; and a crank coupled to said slide for pivotable movement in response to linear movement of said slide, a first contact surface of said crank operably pressing against said abutting surface of said slide thereby wedging said slide against said body to deter rotation of said crank.

62. A clamp and gauging apparatus comprising:

a body;

a powered piston disposed in said body;

a slide linearly moving in relation to said body in response to actuation of said piston, said slide having first and second abutting surfaces;

a crank coupled to said slide for pivotable movement about a fixed axis in response to movement of said slide;

a first contact surface of said crank applying a first force against said abutting surface of said slide when said slide is in an advanced position; and a second contact surface of said crank receiving a second force from said second abutting surface of said slide when said slide is in an advanced position, said second contact surface being linearly offset from said fixed axis, said first contact surface being substantially disposed between said second contact surface and said piston.

63. An apparatus comprising:

a device having a linearly moving powered actuator, a linearly moving slide coupled to said actuator, a link pivotally coupled to said slide, a crank pivotally coupled to said link and an arm pivotally coupled to said crank; and a pair of opposed automotive body panel retainers affixed to said arm for retaining an automotive vehicle body panel.

* * * * *

UNITED STATES PATENT AND TRADEMARK OFFICE

CERTIFICATE OF CORRECTION

PATENT NO. : 5,884,903

DATED : March 23, 1999

INVENTOR(S) : Edwin G. Sawdon

It is certified that error appears in the above-identified patent and that said Letters Patent is hereby corrected as shown below:

Column 1, line 30, "Blaft" should be -- Blatt --.

Column 2, line 58, "FIGS." should be -- FIG. --.

Column 3, line 66, "pressft" should be -- pressfit --.

Column 4, line 17, "30" should be -- 3° --.

Column 4, line 37, "41 L40" should be -- 41L40 --.

Column 6, line 54, "450" should be -- 45° --.

Column 7, line 55, after "gauging" insert -- apparatus --.

Column 8, line 59, "A" should be -- An --.

UNITED STATES PATENT AND TRADEMARK OFFICE
CERTIFICATE OF CORRECTION

PATENT NO. : 5,884,903
DATED : March 23, 1999
INVENTOR(S) : Edwin G. Sawdon

It is certified that error appears in the above-identified patent and that said Letters Patent is hereby corrected as shown below:

Column 9, line 47, after "slide" insert -- , --.

Column 11, line 39, "as" should be -- axis --.

Signed and Sealed this

Twenty-eighth Day of March, 2000

Attest:

Q. TODD DICKINSON

*Attesting Officer* *Commissioner of Patents and Trademarks*